United States Patent [19]
Michaels et al.

[11] Patent Number: 6,011,976
[45] Date of Patent: *Jan. 4, 2000

[54] TELECOMMUNICATIONS SYSTEM WITH VALUE ADDED SERVICE DIRECTORY AND AN INTEGRATED CIRCUIT MODULE THEREFOR

[75] Inventors: Wayne David Michaels, Berkshire; Anthony Richard Timson, Middlesex; Aden William Dervan, London, all of United Kingdom

[73] Assignee: Celltrace Communications Limited, Berkshire, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/557,147

[22] PCT Filed: Jun. 15, 1994

[86] PCT No.: PCT/GB94/01294

§ 371 Date: Apr. 19, 1996

§ 102(e) Date: Apr. 19, 1996

[87] PCT Pub. No.: WO94/30023

PCT Pub. Date: Dec. 22, 1994

[30] Foreign Application Priority Data

Jun. 15, 1993 [GB] United Kingdom ............... 9312320
Jul. 2, 1993 [GB] United Kingdom ............... 9313772
Jul. 8, 1993 [GB] United Kingdom ............... 9314096

[51] Int. Cl.[7] .................. H04Q 7/20; H04B 1/38; H04M 1/00
[52] U.S. Cl. .................. 455/466; 455/558; 455/420
[58] Field of Search ................... 455/422, 425, 455/550, 551, 556–558, 575, 90, 186.1, 418, 419, 420, 88, 466, 564, 70; 340/825.44, 311.1

[56] References Cited

U.S. PATENT DOCUMENTS

| | | | |
|---|---|---|---|
| 4,839,628 | 6/1989 | Davis et al. | 340/825.44 |
| 5,012,234 | 4/1991 | Dulaney et al. | 455/186.1 |
| 5,127,040 | 6/1992 | D'Avello et al. | . |
| 5,128,981 | 7/1992 | Tsukamoto et al. | 455/567 |
| 5,179,373 | 1/1993 | John | 455/419 |
| 5,225,826 | 7/1993 | DeLuca et al. | 340/825.44 |
| 5,349,696 | 9/1994 | Matai | 340/825.44 |
| 5,353,328 | 10/1994 | Jokimies | 455/558 |
| 5,430,892 | 7/1995 | Motegi | 455/558 |
| 5,465,401 | 11/1995 | Thompson | 455/564 |
| 5,555,446 | 9/1996 | Jasinski | 455/88 |

FOREIGN PATENT DOCUMENTS

| | | |
|---|---|---|
| 0 459 344 A1 | 12/1991 | European Pat. Off. . |
| 0 562 890 A1 | 9/1993 | European Pat. Off. . |
| PCT/EP91/ 00292 | 8/1991 | WIPO . |

OTHER PUBLICATIONS

Echo des Recherches, Une application de la carte á microprocesseur: . . . , 1990, No. 139, 1er Tri., Issy/Moulineaux, FR, pp. 13–20.

*Primary Examiner*—Nguyen Vo
*Attorney, Agent, or Firm*—Killworth, Gottman, Hagan & Schaeff, L.L.P.

[57] ABSTRACT

In a telecommunications system such as a global mobile telephone network in which each subscriber unit includes a Subscriber Identity Module (SIM card), each SIM card has fixed memory locations (22), to which data can be addressed over the air. Some of the locations (22) can not be overwritten from the subscriber unit but can be accessed therefrom on the entry of short simple codes, each associated with one of the locations. Further fixed memory locations (24) can be read over the air only when the subscriber enters a personal identification number. Locking control files (27, 28) are used to control read/write access to the locations (22, 24) respectively.

46 Claims, 6 Drawing Sheets

TELECOMMUNICATIONS SYSTEM WITH VALUE ADDED SERVICE DIRECTORY AND AN INTEGRATED CIRCUIT MODULE THEREFOR

This invention relates to a telecommunications system. In particular, but not exclusively, it relates to a mobile communications system such as a cellular mobile radio or telephone system.

A recent innovation in such systems has been the introduction of Subscriber Identity Modules (SIM cards). These are integrated circuit cards which can be releasably inserted into a mobile telephone and which contain in memory the subscriber's identity, i.e. his telephone number. These known SIM cards also have a rolling buffer which can store a certain number of alphanumeric characters. The buffer facilitates the so-called Short Message Service (SMS) in which a message for a subscriber or for a specified group of subscribers can be broadcast over the air, as an advanced form of radiopaging. Messages can be received by a mobile telephone whenever it is idle or on stand-by. However, if a message is received which would overfill the buffer, data is lost on a first-in-first-out basis.

U.S. Pat. No. 5,127,040 describes a method and apparatus for remotely loading repertory telephone numbers into a mobile unit. The numbers can be recalled and used later by the subscriber.

EP-A-0 459 344 describes a method of downloading and executing software in a remote terminal of a communications system.

WO-A-91/12698 discloses a mobile radio telephone having a SIM card which has been programmed only to authorise the use of certain services. Such programming takes place directly and not remotely.

It is an object of the invention to provide a more efficient and remotely reconfigurable SIM card.

From one aspect, the present invention consists in a telecommunications system comprising at least one host station and a plurality of subscriber units, the or each host station being operable to transmit a message to at least one of the subscriber units, and each subscriber unit having a multiplicity of fixed memory locations and means responsive to the detection of the message to store the message in a selected one of the fixed memory locations which can not be overwritten from the subscriber unit, but which can be accessed from the subscriber unit when required, characterised in that each subscriber unit includes means responsive to an instruction transmitted from the or each host station selectively to enable or prohibit said fixed memory locations to be overwritten or to be read from the or each host station or from the subscriber unit.

In this description and the accompanying claims, a "fixed" memory locations means a location into which data can be written, and excludes first-in-first-out or circular buffers. Overwriting of all the data in certain "fixed" memory locations may occur in contrast to the first-in-first-out loss of data experienced with current SMS buffers.

Thus, for example, a set of telephone numbers, each with an identifying alphanumeric tag, can be transmitted to the SIM card, allowing users easy access to commonly used services such as hotels, car hire or airline reservations. This feature is known as a Value Added Service Directory.

A message may be retrievable by the subscriber on the entry of simple, short codes into the subscriber unit, each memory location corresponding to a particular code. A message may include a telephone number and, once stored, may be able to be overwritten over the air. Preferably, the or each host station is operable to transmit a request for information stored in a subscriber unit. The information may be included in a message and it may also include information which is stored in a secure memory location, accessible only when the subscriber enters a personal identification number (PIN number). The information may include credit details relevant to the subscriber, for example, a credit card number of credit status, thus greatly facilitating credit card transactions carried out over the telephone. Using this feature of the invention, a credit account holder avoids having to dictate his account details and need only enter the mandatory PIN number.

The host station may be operable to transmit instructions to lock and/or unlock a memory location at the subscriber unit. It may be operable to transmit instructions to run a program stored in memory locations at the subscriber unit. The host station may be operable to transmit files containing functional data and/or files containing non-functional data to the subscriber unit.

The messages, requests for information and the instructions being transmitted may be in a specific format which the subscriber unit is able to distinguish from other formats. The specific format may be made secure against interception.

In a preferred embodiment, the subscriber unit comprises a mobile radio or telephone and an integrated circuit card which can be removably connected to the radio-telephone. The integrated circuit card may contain the memory locations and may contain means for distinguishing the specific format from other formats. The card may contain means for distinguishing between the messages, requests for information and instructions. The card may also contain the means for storing the messages and means for acting on the requests and instructions.

From another aspect, the invention consists in a module for controlling a subscriber unit in a telecommunications system, being removable connected to a transceiver of the subscriber unit, and comprising a multiplicity of fixed memory locations, and means responsive to the detection of a message transmitted remotely thereto to store the message in a selected one of the fixed memory locations, characterised by means responsive to instructions transmitted remotely thereto to render any or all of said fixed memory locations accessible or inaccessible for overwriting or reading from either the subscriber unit or the host station.

The module may include a directory structure within which files can be stored.

The invention is particularly applicable to global telecommunication systems in which the mobile cellular telephone networks of various countries or areas communicate using a common standard. An example of such a global system is GSM (Global System for Mobile Communications) currently operating in Europe. However the invention is not limited to global systems and could be applied to a single national cellular network or even to a fixed land-linked network.

Figure 1:
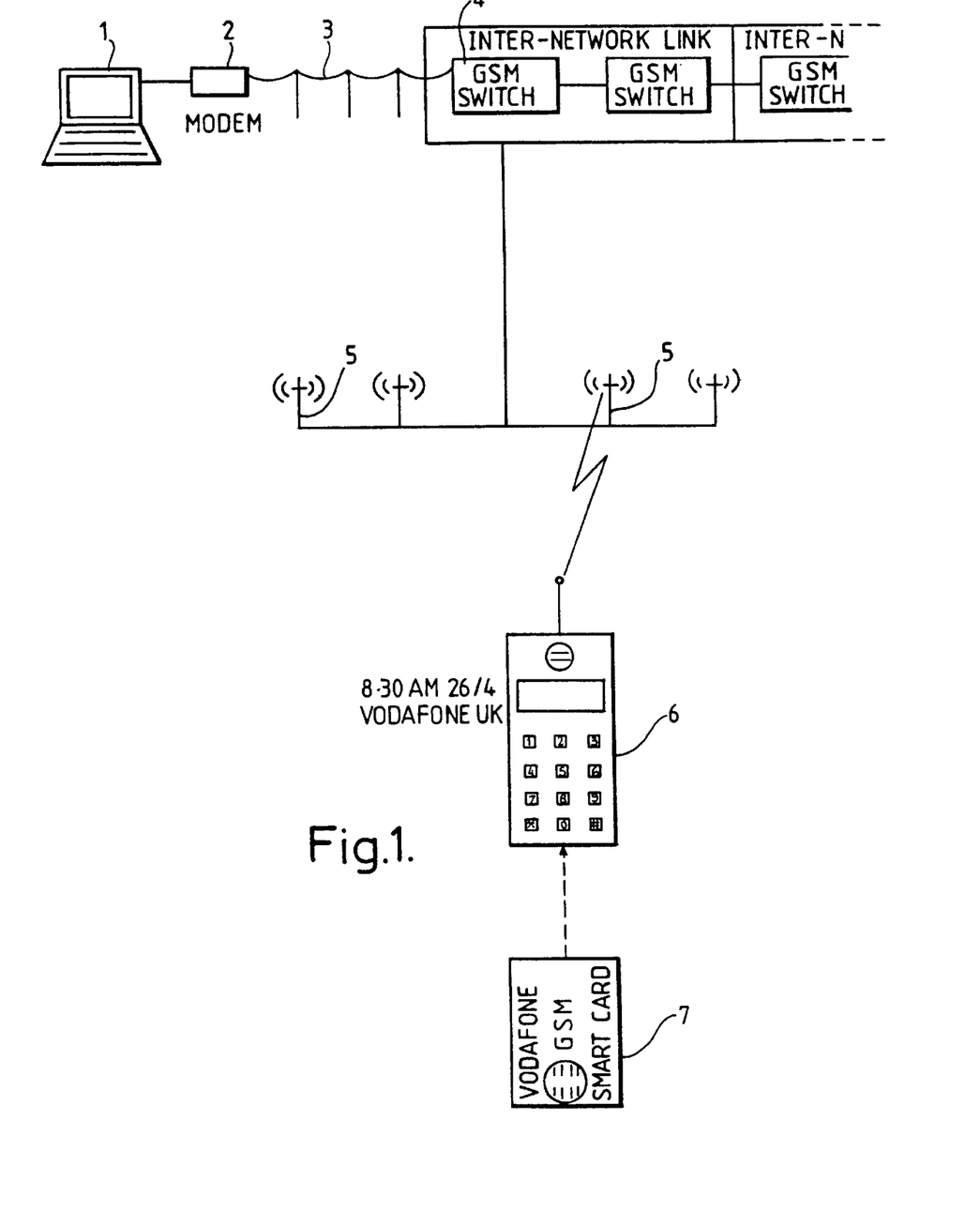
FIG. 1 shows the transmission of messages to a subscriber unit in a system according to the invention.

An embodiment of the invention will now be described by way of example with reference to the accompanying drawings in which:

FIG. 1 illustrates an SMS distribution path according to the invention. In the prior art, the short messages have usually been directed to a single subscriber or a specified group of subscribers such as a sales team.

However, GSM also supports a feature known as Cell Broadcast in which messages can be sent to all the subscribers in a particular area. In the embodiment of the invention illustrated, a message consists of the telephone number of an advertiser and an alphanumeric tag to identify the advertiser.

An operator enters the message into a terminal 1. The message is then coded into a secure format known to applicants as an Embedded Command Stream (ECS) and sent via a modem 2 and a fixed line 3 to a local GSM switch 4. According to its delivery address, the message is delivered to any or all of the other switches within that network, or even across networks.

The switch 4, which in this example is in the geographical area to which the message is to be transmitted, delivers the message to a number of cellsites 5. The cellsites 5 are the base transceiver stations of the GSM network.

Each cellsite 5 then broadcasts the message to a group of transceivers or mobile telephones, hereinafter referred to as "mobiles". If Cell Broadcast is used, the group consists of all mobiles within the geographical area at the time of the broadcast.

A selected mobile 6 receiving the message transmits a confirmation of receipt back to its respective cellsite 5. From now on, until an update situation, the system will not contact this mobile 6 again.

The mobile 6 recognises the message as SMS data and passes it to a SIM card 7, which is a small self-contained microprocessor, held in a slot in the mobile 6. The SIM card 7 in turn recognises the ECS using special hardware and software and stores the message in memory in such a way that it may not be overwritten by the subscriber. Known SIM cards contain a large number of fixed memory locations in which the subscriber can store frequently dialled numbers and corresponding alphanumeric tags. The SIM card 7 of the invention stores the message in one of these locations, and then carries out a write protect operation. The locations dedicated to storing write protected messages may be designated by code numbers relating to a particular category of advertiser. Thus, for example, car hire company telephone numbers can be stored in location 01, hotel reservations in location 02 and so on.

Figure 2:
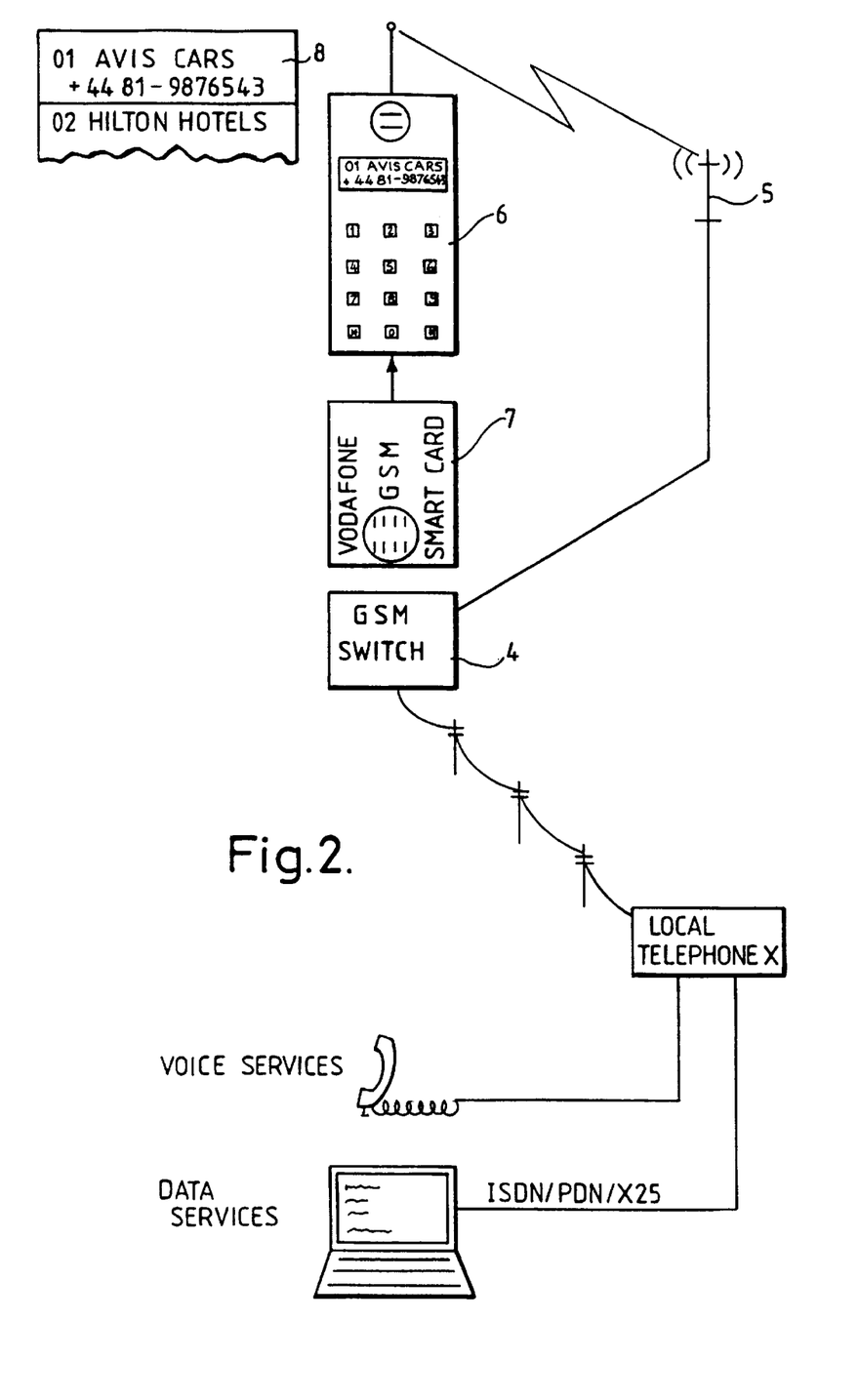
FIG. 2 shows a process in which a subscriber unit transmits a message and requested information.

FIG. 2 shows a call placing process in which a subscriber communicates with an advertiser. The subscriber, remembering that the car hire company's number is in location 01 as shown at 8, keys in a short code corresponding to the location, such as 01#. The mobile 6 then interrogates the SIM card 7 to retrieve the telephone number from the location. The SIM card 7 provides both the number and the alphanumeric tag giving the company's name and displays it to the subscriber. The user confirms that he wishes to proceed by pressing SEND.

Next, the mobile obtains a voice channel through which the call proceeds to the dialled number. The GSM system automatically handles intra-network and inter-network hops. At this point the subscriber can hold a voice conversation with the company.

Providing the correct equipment has been installed at the company, as soon as the call is answered, subscriber identity information read from the SIM card 7 gives the company immediate customer billing details such as a name and address.

The SIM card 7 also contains information detailing the subscriber's credit account. This information is held in a separate, secure memory location, accessible only when the subscriber enters a mandatory PIN number, known only to himself, thus confirming that the mobile has not been stolen or lost. When the subscriber has confirmed his car hire deal, he enters the PIN number into the mobile 6, requesting the credit information from the SIM card 7. The SIM card 7 supplies the information and the mobile uses existing voice/data techniques to transmit the information to the company, in a format secure against detection by fraudsters. The sale is confirmed by the company of on its equipment and the call is terminated.

In this example, it is also possible to obtain a telephone or fax number from the operator-assisted directory enquiries system without the subscriber having to manually enter the number into the communications terminal which he desires to use.

To use this feature, the subscriber calls network directory enquiries and gives the name of the person, company or service of which he wishes to ascertain the telephone number, as well as any additional information requested by the operator answering the call. The operator then locates the number, confirms it and enquires as to whether the number is to be transmitted verbally, transferred over SMS into a given memory location of the subscriber's SIM card or both. If the subscriber chooses a SIM update, the voice call is terminated and the operator initiates the SMS process by entering a sequence into a computer or pressing a dedicated button. The telephone number is then encoded into an ECS message at the despatch centre and is posted across the network to the subscriber's communications terminal, which transmits a confirmation to the despatch centre. Thus the retry mechanism, which operates until such a confirmation is received, is suspended.

The communications terminal recognises the message as SMS data, passes it to the SIM card, and if capable, displays a "message received" banner. The SIM card in turn recognises the ECS using special hardware and software, and decodes it accordingly. The number, and any associated alphanumeric tag, which would normally consist of the name of the person or company, are recovered together with the memory location in which they are intended to be stored. The number and name-tag are then written to that location and are write-protected if requested by the subscriber, the overwrite protection being encoded into the message at source.

Subsequently, the subscriber attempts to place a call to the number in the known memory location by keying in the memory location number. The SIM card passes the telephone or fax number to the communications terminal on demand, and upon receipt of the subscriber's confirmation, the communications terminal sets up the call to the desired number.

Figure 3:
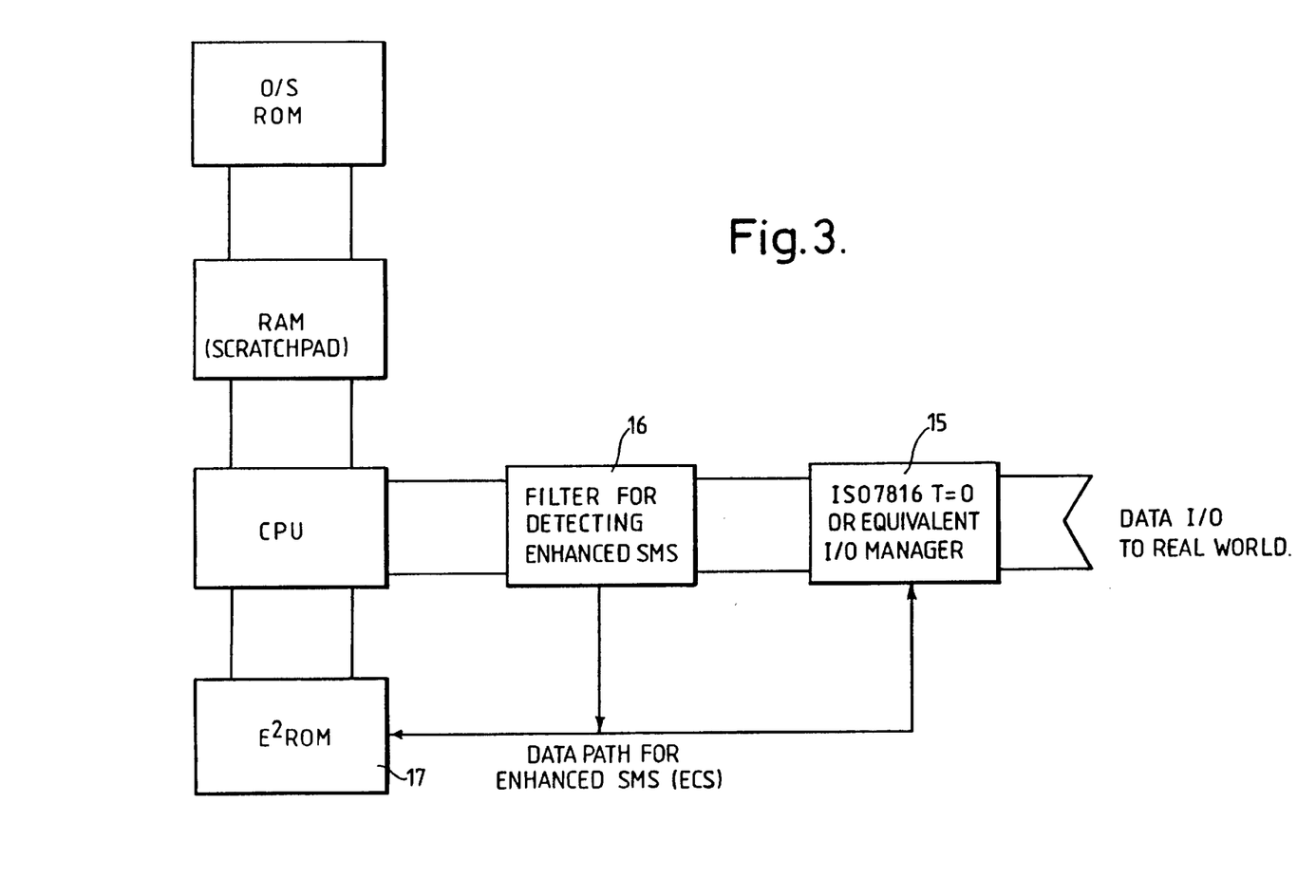
FIG. 3 is a block diagram showing elements of a module shown in FIGS. 1 and 2.

FIG. 3 shows the electronic structure of the SIM card 7. The card communicates with the mobile to which it is connected via an input/output (I/O) manager 15, preferably using the protocol ISO 7816 T=0. A filter 16 receives incoming data from the I/O manager and detects any ECS messages from among the short messages received. The ECS messages are sent directly to an extended erasable read only memory ($E^2ROM$) 17, which is preferably a "flash" $E^2ROM$. Data can also be output from the $E^2ROM$ directly to the I/O manager 15. The remaining blocks shown in FIG. 3 are standard components of a SIM card.

Figure 4:
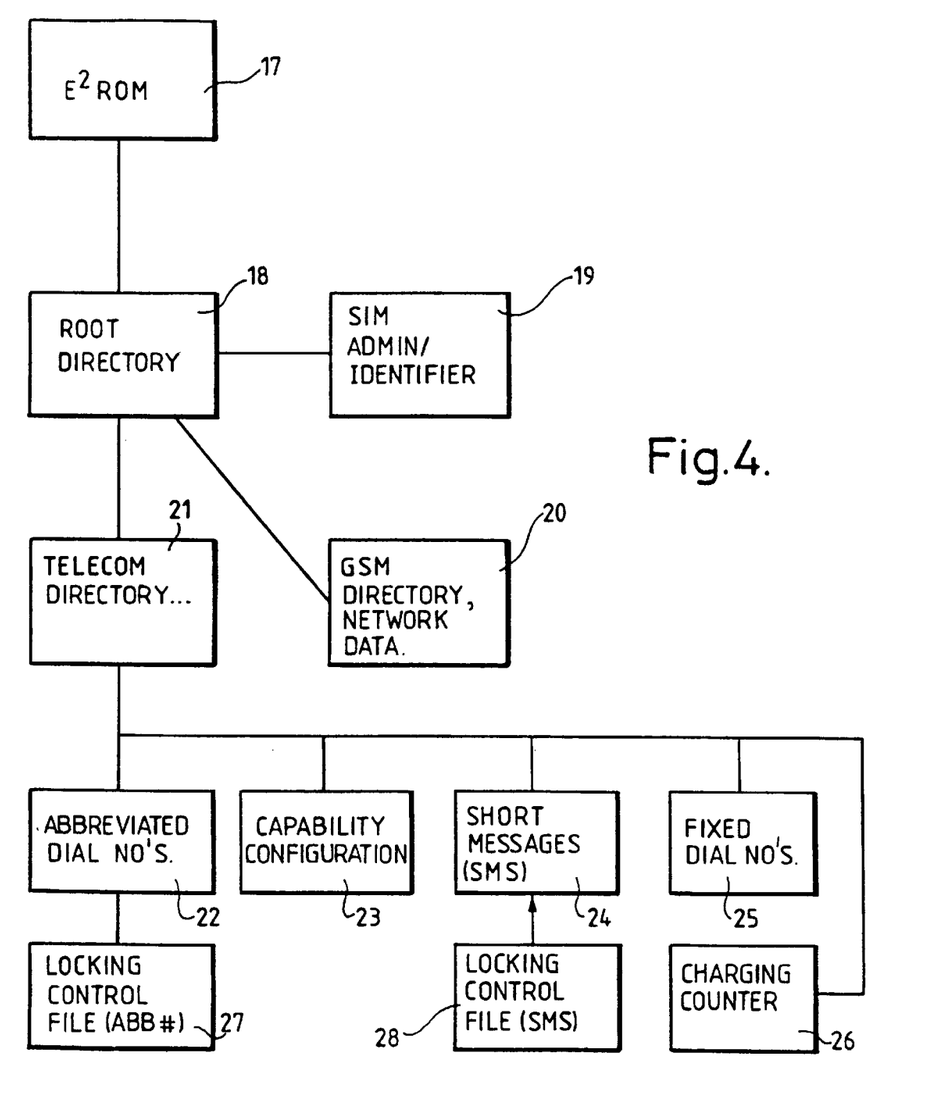
FIG. 4 shows details of one of the blocks shown in FIG. 3.

FIG. 4 shows how the $E^2ROM$ is organised. A root directory 18 contains a SIM administration and identifier 19, a GSM directory and network data 20, and a telecom directory 21.

The telecom directory in turn contains memory locations as follows: "abbreviated dial numbers" 22, "capability configuration" 23, "short messages" 24, "fixed dial numbers" 25, and "charging counter" 26. Each block represents a plurality of memory locations. The frequently dialled numbers and corresponding alphanumeric tags are stored at locations 22.

The "abbreviated dial numbers" locations 22 and the "short messages" locations 24 each have an associated locking control file 27, 28 respectively. The locking control files constitute means for read/write protecting and removing read/write protection from their associated memory locations. The locking control files 27, 28 will typically be in the telecom directory 21 as shown, however they can be located elsewhere such as in an administration directory.

Figure 5:
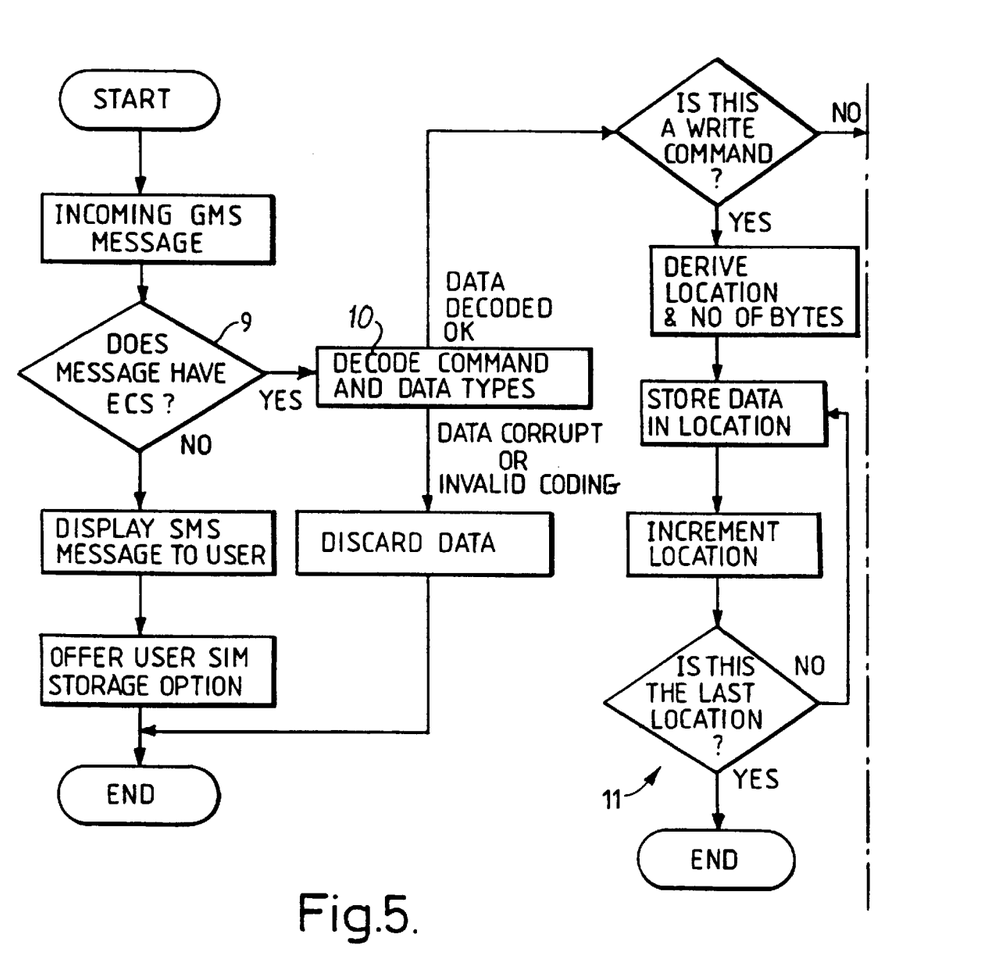
FIG. 5 is a flowchart showing the operation of the module shown in FIGS. 1 to 4.

FIG. 5 is a flowchart illustrating the operation of the SIM card 7, which uses the specially fabricated hardware and software which has been described above to implement the operations illustrated. At lozenge 9, messages, requests, and instructions having ECS are distinguished from those without. Each of these ECS types consists of a data stream headed by a command which is one of at least four types: write commands for the messages, read commands for the requests for information, attribute commands for lock or unlock instructions and run commands for instructions to run a program.

The command and data types are decoded at box 10 and acted on in one of the four paths 11–14.

Path 11 handles the write commands to store messages starting at a location specified therein. Path 12 handles the read commands; again, the requests for information contain a location to be accessed first. Successive locations are read and the data stored in a buffer until the required amount of data has been read. The data in the buffer is then encoded into the ECS format and despatched from the mobile using SMS to the calling party.

In path 13, attribute commands are used to lock or unlock specified memory locations and render them accessible or inaccessible, either to calling parties or to the subscriber. In path 14, run commands cause a program stored in the SIM card to be run.

The basic ECS system is expandable to up to 255 internal shell commands of which write, read, lock/unlock and run are four examples. The specific protocol used for the transfer of information is not fixed and could be ISO7816 T=0 or any other suitable protocol.

The internal shell commands are a supplement to the ability of the system to create external file objects within the SIM card 7. The file objects are of two types: Application Data File Programs (ADFP's) containing functional data which can be executed by the SIM card processor and can self modify if required and Application Data Files (ADF's) containing non-functional data which does not have these capabilities. Existing ADF(P)'s can be modified over-the-air enabling advanced facilities such as personalisation, re-personalisation or downloadable phone book.

The SIM card 7 has a directory structure, similar to that of a computer disk, and new ADF(P)'s can be downloaded into any directory over the air. Also over the air, directories can be created, deleted and modified, multiple tree directory operations can be carried out and ADF(P)'s that are no longer required can be deleted. The amount of ADF(P) data which can be downloaded is limited only by the size of the $E^2ROM$ memory of the card.

The invention, as described, greatly extends the applications of SIM cards. For example, using the Value Added Services Directory, subscribers can book hotels and airline seats over their mobiles quickly and easily.

An additional advantage of this feature of invention is that the geographical distribution of messages to cards in a specific area such as the South of France is facilitated. Thus advertisers can direct their messages to all mobile subscribers in the specific area. This is particularly useful when subscribers "roam" from one area to another and have no knowledge of local services.

The directory enquiries download enables contact telephone or fax numbers to be delivered to a subscriber's communications terminal without any intervention by the subscriber. The process of manually entering a number whilst engaged in a call to the operator is often dangerous, especially when the subscriber is driving.

The ability of the system to download ADF(P)'s means that additional services can be added to the SIM card over the air while maintaining total compatibility with the existing cellular system. Thus the SIM card could acquire the functions of a credit card, passport, driving licence, car park pass, membership card and so on, becoming a multi-service card. Also, dynamically updatable services can be added which require a different process to be run each time a service is accessed.

Once the card has extra services on it, it can be used outside of the mobile phone environment if desired as a standalone item. This can be read from or written to by a dedicated piece of hardware, such as a point of sale machine. If desired, the new services can be deleted, however the card will never lose its mobile phone SIM capability. In addition, if the card has extra services, they will continue to function even if the subscriber has been disconnected from the mobile phone network, unless otherwise desired.

Modifications are possible without departing from the scope of the invention.

For example, the SIM card can be trained only to receive messages detailing services relevant to the subscriber's needs.

We claim:

1. A telecommunications system comprising at least one host station and a plurality of subscriber units, said host station being operable to transmit messages to at least one of said subscriber units, and each said subscriber unit having a multiplicity of memory locations adapted to be accessible from said subscriber unit, means responsive to the detection of a first message to store said first message in one of said memory locations, access means enabling said memory locations to be selectively accessed from said subscriber unit when required, and means responsive to an instruction transmitted from said host station selectively to enable or prohibit accessing of said memory locations from at least one of said host station and said subscriber unit, at least one of said subscriber units comprising a transceiver and an integrated circuit module having said memory locations, and means responsive to the detection of said first message by the transceiver to route said first message to said one of said memory locations, said module being removably connected to said transceiver and including means responsive to the entry of a simple short code to read said first message from the respective memory location, means responsive to a request transmitted from said host station for information stored in a selected one of said memory locations of said module to read and transmit said information to said transceiver, a multiplicity of further memory locations which can be overwritten from the respective subscriber unit, means for selectively enabling or prohibiting said further memory locations to be overwritten or to be read, means responsive to an instruction transmitted from said host station for running a program stored in a said further memory location, and means for recognizing a specific format in which said first message, request for information and instruction are transmitted.

2. A telecommunications system comprising at least one host station and a plurality of subscriber units, each said subscriber unit having a multiplicity of memory locations adapted to be accessible from said subscriber unit, said host station being operable to transmit to at least one of said subscriber units first messages coded in a predetermined first format and second messages coded in a second format distinguished from said first format, said second messages coded in said second format each comprising a data stream including an embedded command which is one of at least a write command for writing data into a selected said memory location of said subscriber unit, a read command for requesting data stored in said subscriber unit, an attribute command to enable or prohibit access to a selected said memory location from at least one of said host station and said subscriber unit, and a run command for executing functional data stored in a selected said memory location, and each said subscriber unit having means for detecting incoming said first and second messages, means for distinguishing the formats of said first and second messages, means connected to said distinguishing means for displaying messages distinguished as said first messages, means connected to said distinguishing means for decoding messages distinguished as said second messages, and means responsive to said commands of said second messages to determine and undertake appropriate processing of the data contained in said second messages.

3. A system as claimed in claim 2, wherein each said subscriber unit includes access means enabling said memory locations thereof to be selectively accessed, when required, to fetch from a selected said memory location data stored therein.

4. A system as claimed in claim 3, wherein each said subscriber unit includes means to present information corresponding to data fetched from a selected said memory location to a user of said subscriber unit, and means for transmitting data fetched from a selected said memory location to said host station.

5. A system as claimed in claim 4, wherein said means for transmitting said data fetched from a selected said memory location is adapted to transmit said data as a second message coded in said second format.

6. A system as claimed in claim 5, wherein said data is fetched from successive said memory locations, is buffered, coded in said second format and, thereafter, transmitted.

7. A system according to claim 3, wherein said memory locations include memory locations identified by short codes and including means responsive to the entry of a selected said short code by said access means to fetch said data from a corresponding said memory location.

8. A system as claimed in claim 7, wherein said short codes are abbreviated dial number codes.

9. A system as claimed in claim 7, wherein each subscriber unit includes send means for instigating dialling of a telephone number contained in said fetched data and, in response to an answering signal from said telephone, data is fetched from a predetermined said memory location and sent to receiving equipment associated with said telephone number.

10. A system as claimed in claim 3, wherein said memory locations include secure memory locations and said access means is only able to fetch data from a selected said secure memory location in response to entry of a personal identification signal into said subscriber unit.

11. A system as claimed in claim 2, wherein said second messages are coded in a secure second format.

12. A system as claimed in claim 11, wherein said first and second messages are transmitted using a short message service.

13. A system as claimed in claim 2, wherein said second messages carry executable application data file programs for providing each said subscriber unit with additional services.

14. A system as claimed in claim 2, wherein said memory locations have file handling capabilities including directory functions.

15. A system as claimed in claim 14, wherein data involving said attribute commands is stored in locking control files within predetermined directories.

16. A system as claimed in claim 2 which is a cellular radio communication system.

17. A system as claimed in claim 16, including means for transmitting said second messages simultaneously to more than one of said subscriber units via cell broadcasting.

18. A system as claimed in claim 2, wherein said memory locations, detecting and decoding means and means responsive to said commands are comprised in integrated circuit modules removably connected to said subscriber units.

19. A module for controlling a subscriber unit in a telecommunications system including at least one host station, said module being adapted to be removably connected to said subscriber unit, and said module comprising a multiplicity of memory locations adapted to be accessible from said subscriber unit, means for detecting first and second messages transmitted thereto, said first messages being coded in a predetermined first format and said second messages being coded in a second format distinguished from said first messages used in said system in that said second format comprises a data stream including an embedded command which is one of at least a write command for writing data into a selected said memory location, a read command for requesting data stored in said subscriber unit, an attribute command to enable or prohibit access to a selected said memory location from at least one of said host station and said subscriber unit, and a run command for executing functional data stored in a selected said memory location, means for detecting incoming said first and second messages, means for distinguishing the formats of said first and second messages, means connected to said distinguishing means for instigating display of messages distinguished as said first messages, means connected to said distinguishing means for decoding messages distinguished as said second messages, and means responsive to said commands to determine and undertake appropriate processing of data contained in said second messages.

20. A module as claimed in claim 19, including means operable to fetch data stored in a selected said memory location and transmit said data stored to said subscriber unit.

21. A module as claimed in claim 20, wherein said means responsive to said commands is adapted to transmit said data as a second message coded in said second format.

22. A module as claimed in claim 20, wherein said means responsive to said commands is also responsive to a personal identification signal entered into said subscriber unit.

23. A module as claimed in claim 20, wherein said memory locations are identified by short codes and said module includes means responsive to said short codes to transmit data from said selected memory location.

24. A module as claimed in claim 19, including a directory structure for addressing said memory locations.

25. A module as claimed in claim 19, wherein said module is programmable for use remotely from said subscriber unit by downloading extra services onto said module, via said at least one host station, prior to removing said module from said subscriber unit.

26. A module as claimed in claim 19, wherein said module is in the form of an integrated circuit card.

27. A telecommunications system comprising at least one host station and a plurality of subscriber units, each said subscriber unit having a multiplicity of memory locations adapted to be selectively accessible from said at least one host station and said subscriber unit, means at said host station operable to transmit to at least one of said subscriber units first messages coded in a predetermined first format, means at said host station operable to transmit to said at least one subscriber unit preselected second messages coded in a second format which is distinguished from said first format, said second format comprising a data stream having an embedded command, and each said subscriber unit having means for receiving said transmitted first and second messages, means for distinguishing said formats, means connected to said distinguishing means for decoding said second messages transmitted in said second format, means for detecting when a decoded said second message comprises an embedded command which is an attribute command selectively identifying at least one of said memory locations which is to be locked or unlocked so as to render said at least one memory location accessible or inaccessible to at least one of said host station and said subscriber unit, and means for processing said attribute command to lock or unlock said at least one memory location, whereby to control access to said at least one memory location from at least one of said host station and said subscriber unit.

28. A system as claimed in claim 27, including means for detecting when a decoded said second message comprises an embedded command which is a write command, and means for writing data comprised in said second message into at least one of said memory locations.

29. A system as claimed in claim 28, wherein said attribute command locks said at least one memory location to prevent overwriting from at least one of said host station and said subscriber unit.

30. A system as claimed in claim 29, wherein each said subscriber unit includes access means enabling said memory locations of said subscriber unit to be selectively accessed, when required, to fetch from a selected said memory location data stored therein.

31. A system as claimed in claim 30, wherein each said subscriber unit includes means to present information corresponding to data fetched from a selected said memory location to a user of said subscriber unit, and means for transmitting data fetched from a selected said memory location to said at least one host station.

32. A system as claimed in claim 27, wherein said attribute command locks said at least one memory location to prevent reading of data stored therein from at least one of said host station and said subscriber unit.

33. A system as claimed in claim 27, including means for detecting when said decoded second message comprises an embedded command which is a read command, and means for reading data stored in at least one of said memory locations as identified by said read command, a buffer for storing the data read from said at least one memory location, means for encoding said stored data into a third message coded in said second format, and means for transmitting said third message.

34. A system as claimed in claim 33, wherein said at least one memory location is a secure memory location and said data is only fetched and transmitted from a said secure memory location in response to entry of a personal identification signal into said subscriber unit.

35. A system as claimed in claim 27, including means for detecting when a decoded said second message comprises an embedded command which is an execute command, and means for executing data stored in at least one said memory location.

36. A system as claimed in claim 27, including means for detecting when a decoded said second message comprises an executable application data file program for providing additional services, and means for executing said program.

37. A module for controlling a subscriber unit in a telecommunications system including at least one host station, said module being adapted to be removably connected to said subscriber unit, and said module comprising a multiplicity of memory locations adapted to be selectively accessible from said at least one host station and said subscriber unit, means for detecting first and second messages transmitted thereto from said at least one host station, said first message being coded in a predetermined first format and said second message being coded in a second format which is distinguished from said first format, said second format comprising a data stream having an embedded command, said module further comprising means for detecting received first and second messages, means for distinguishing said formats, means connected to said distinguishing means for decoding said second messages coded in said second format, means for detecting when a decoded said second message comprises an attribute command selectively identifying at least one of said memory locations which is to be locked or unlocked so as to render said at least one memory location accessible or inaccessible to at least one of said host station and subscriber unit, and means for processing said attribute command to lock or unlock said at least one memory location, whereby to control access to said at least one memory location from at least one of said host station and said subscriber unit.

38. A module as claimed in claim 37, including means for detecting when a decoded said second message comprises an embedded command which is a write command, and means for writing data comprised in said second message into at least one of said memory locations.

39. A module as claimed in claim 38, wherein said attribute command locks said at least one memory location to prevent overwriting from at least one of said host station and said subscriber unit.

40. A module as claimed in claim 39, wherein each said subscriber unit includes access means enabling said memory locations of said subscriber unit to be selectively accessed, when required, to fetch from a selected said memory location data stored therein.

41. A module as claimed in claim 40, wherein each said subscriber unit includes means to present information corresponding to data fetched from a selected said memory location to a user of said subscriber unit, and means for transmitting data fetched from a selected said memory location to said at least one host station.

42. A module as claimed in claim 37, wherein said attribute command locks said at least one memory location to prevent reading of data stored therein from at least one of said host station and said subscriber unit.

43. A module as claimed in claim 37, including means for detecting when said decoded second message comprises an embedded command which is a read command, and means for reading data stored in at least one of said memory locations as identified by said read command, a buffer for storing the data read from said at least one memory location, means for encoding said stored data into a third message coded in said second format, and means for transmitting said third message.

44. A module as claimed in claim 43, wherein said at least one memory location is a secure memory location and said data is only fetched and transmitted from a said secure memory location in response to entry of a personal identification signal into said subscriber unit.

45. A module as claimed in claim 37, including means for detecting when a decoded said second message comprises an embedded command which is an execute command, and means for executing data stored in at least one said memory location.

46. A module as claimed in claim 37, including means for detecting when a decoded said second message comprises an executable application data file program for providing additional services, and means for executing said program.

* * * * *

UNITED STATES PATENT AND TRADEMARK OFFICE
CERTIFICATE OF CORRECTION

PATENT NO : 6,011,976
DATED : January 4, 2000
INVENTOR(S) : Wayne D. Michaels, et al.

It is certified that error appears in the above-identified patent and that said Letters Patent is hereby corrected as shown below:

On title page, item 86 PCT No.:
replace "PCT/GB94/01294"
with --PCT/GB94/01295--.

Signed and Sealed this

Sixth Day of February, 2001

Attest:

Q. TODD DICKINSON

*Attesting Officer*       *Director of Patents and Trademarks*